H. LAWRENCE.
VINE AND WEED CUTTER.

No. 110,477. Patented Dec. 27, 1870.

United States Patent Office.

HARRY LAWRENCE, OF NEW YORK, N. Y.

Letters Patent No. 110,477, dated December 27, 1870.

IMPROVEMENT IN VINE AND WEED-CUTTERS.

The Schedule referred to in these Letters Patent and making part of the same.

*To all whom it may concern:*

Be it known that I, HARRY LAWRENCE, of the city, county, and State of New York, have invented a new and improved Vine and Weed-Cutter; and I do hereby declare that the following is a full, clear, and exact description thereof, which will enable others skilled in the art to make and use the same, reference being had to the accompanying drawing forming part of this specification.

This invention relates to improvements in apparatus for removing the vines of potatoes, weeds, and the like in advance of the potato-digging machines; and It consists in a pair of forked gathering-blades, a discharging-trough, and a rotary cutter, mounted on a truck, or it may be on the potato-digging machine, for gathering, cutting, and discharging the vines and weeds, all as hereinafter described.

Similar letters of reference indicate corresponding parts.

Figure 1:
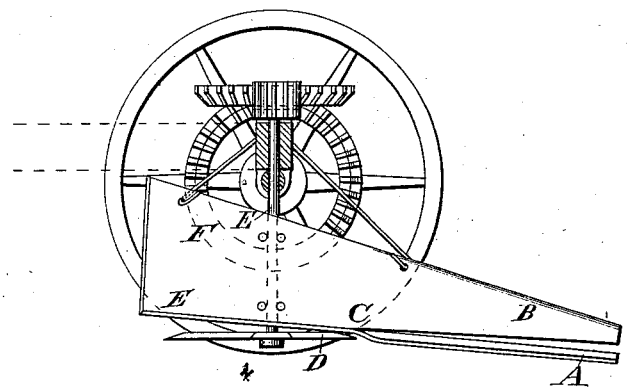
Figure 1 is a sectional elevation of my improved machine.
Figure 2:
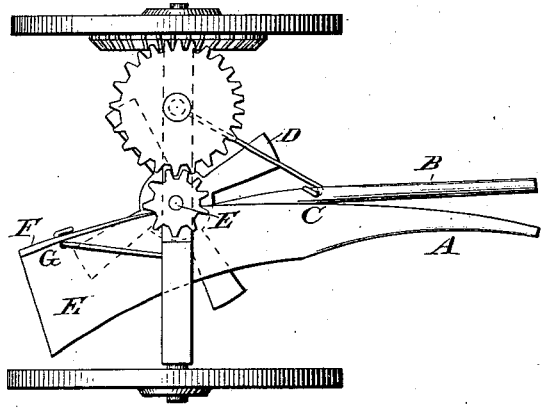
Figure 2 is a plan view of the same.

A and B represent a pair of forked blades, suspended from the truck, so as to project ahead of the axle along the ground, with the points depressed, so as to glide along between the surface and the overhanging weeds and vines, and gather them into the angle C, where they converge, to be cut by the rotary cutter D, suspended from the axle by the vertical shaft E, and driven by gearing connected with one of the wheels of the truck, the said cutter being arranged to revolve immediately under the blades.

The blade A is arranged mainly in a horizontal plane, and is extended behind the angles C, at E, in a curved form, to serve for the bottom of a discharging-trough, while the blade B is arranged more nearly vertical, and also extended behind the angle C at F, to serve as a side wall to the said discharge; it also serves to conduct the vines past the shaft of the cutter to prevent clogging.

These blades are made of sheet metal, and may either be formed together, with the parts E and F of two pieces joined at the angle G of the said parts, or the whole may be made of one sheet of metal, properly split and shaped, as may be preferred.

In this example the cutter-blades are arranged to cut against the vertical side of the blade B, but it may be arranged to run the other way, and cut against the edge of the blade A, and the latter may be made capable of cutting in conjunction with the rotary cutters.

Having thus described my invention,

I claim as new and desire to secure by Letters Patent—

The combination of the gathering-blades, rotary cutter, and the discharger, either mounted on an independent truck or on the truck of a potato-digging machine, all substantially as specified.

HARRY LAWRENCE.

Witnesses:
ALEX. F. ROBERTS,
THOS. D. D. OURAND.